(12) United States Patent
Roth

(10) Patent No.: US 9,381,600 B2
(45) Date of Patent: Jul. 5, 2016

(54) APPARATUS AND METHODS TO MANUFACTURE PDC BITS

(75) Inventor: Cary A. Roth, Spring, TX (US)

(73) Assignee: Smith International, Inc., Houston, TX (US)

(*) Notice: Subject to any disclaimer, the term of this patent is extended or adjusted under 35 U.S.C. 154(b) by 1826 days.

(21) Appl. No.: 12/505,997

(22) Filed: Jul. 20, 2009

(65) Prior Publication Data

US 2010/0018353 A1    Jan. 28, 2010

Related U.S. Application Data

(60) Provisional application No. 61/082,745, filed on Jul. 22, 2008.

(51) Int. Cl.
| | |
|---|---|
| *B21K 31/00* | (2006.01) |
| *B23P 15/28* | (2006.01) |
| *B23K 15/00* | (2006.01) |
| *B23K 15/06* | (2006.01) |
| *B23K 31/02* | (2006.01) |

(52) U.S. Cl.
CPC .............. *B23P 15/28* (2013.01); *B23K 15/0053* (2013.01); *B23K 15/0093* (2013.01); *B23K 15/06* (2013.01); *B23K 31/025* (2013.01); *B23K 2201/20* (2013.01); *B23K 2203/04* (2013.01)

(58) Field of Classification Search
USPC .............. 76/108.2, 108.4; 175/331, 371, 374, 175/428; 219/121.14
See application file for complete search history.

(56) References Cited

U.S. PATENT DOCUMENTS

| | | | | |
|---|---|---|---|---|
| 3,907,191 | A * | 9/1975 | Lichte | 228/182 |
| 4,229,638 | A * | 10/1980 | Lichte | 219/121.35 |
| 4,414,734 | A * | 11/1983 | Atkinson | 29/464 |
| 4,560,175 | A * | 12/1985 | Kar et al. | 175/371 |
| 4,817,852 | A * | 4/1989 | Hill | 228/114 |
| 4,914,268 | A * | 4/1990 | Hixon et al. | 219/121.14 |
| 5,977,509 | A * | 11/1999 | Ratcliff | 219/121.14 |
| 7,776,256 | B2 * | 8/2010 | Smith | B22F 7/062 419/10 |
| 8,616,089 | B2 * | 12/2013 | Choe | B22D 19/14 76/108.4 |
| 2007/0102199 | A1 * | 5/2007 | Smith et al. | 175/374 |
| 2008/0105659 | A1 * | 5/2008 | Arnett et al. | 219/121.14 |
| 2010/0018353 | A1 * | 1/2010 | Roth | 76/108.4 |
| 2011/0162893 | A1 * | 7/2011 | Zhang | 175/428 |
| 2014/0291033 | A1 * | 10/2014 | Amundsen | E21B 10/00 175/327 |

* cited by examiner

*Primary Examiner* — Hwei C Payer

(57) ABSTRACT

A method to manufacture a drill bit including constructing a bit head portion of the drill bit, constructing a bit shank portion of the drill bit, aligning the bit head portion with the bit shank portion, and electron beam welding a butted joint between the bit head portion and the bit shank portion.

10 Claims, 3 Drawing Sheets

APPARATUS AND METHODS TO MANUFACTURE PDC BITS

CROSS-REFERENCE TO RELATED APPLICATIONS

This application claims the priority of a provisional application under 35 U.S.C. §119(e), namely U.S. Patent Application Ser. No. 61/082,745 filed on Jul. 22, 2008, which is incorporated by reference in its entirety herein.

BACKGROUND OF THE DISCLOSURE

1. Field of the Disclosure

The present disclosure relates to drill bits used in the oil and gas industry. Specifically, the disclosure relates to an improved method of manufacturing earth-boring bits for drilling earth formations.

2. Description of the Related Art

Drill bits are used in the oil and gas industry to drill earth formations in the exploration for gas and oil. FIG. 1 depicts a drilling rig which incorporates a drill bit 10. Drill bit 10 is connected to the bottom of a drill string 13 to drill a wellbore 15. The drillstring may be controlled by surface equipment configured to rotate the drill string, apply downward force (i.e., weight on bit) to the drill bit to penetrate the earth formation and supply drilling fluid to drill bit 10 by pumping the fluid through a bore of the drill string. Because a variety of earth formations are penetrated in the pursuit of oil and gas, several different types and configurations of drill bits are used. These drill bits are typically grouped into two categories, drag bits (also known as shear cutter bits) and roller cone bits.

Shear bits are drill bits that cut the earth's formation by primarily scraping the earth formation as they are rotated by a drillstring and/or a downhole motor in a drilling operation. Shear bits include those having cutters (sometimes referred to as cutter elements, cutting elements or inserts) attached to the bit body. For example, the cutters may be formed having a substrate or support stud made of carbide, for example tungsten carbide, and an ultra hard cutting surface layer or "table" made of a polycrystalline diamond material or a polycrystalline boron nitride material deposited onto or otherwise bonded to the substrate at an interface surface. The shear bit may be fixed to the drill string which is rotated so, as the drill string rotates, the bit also rotates to cut into the earth formation. Shear bits typically do not have any moving parts upon the bit itself, only the bit body moves from the rotation of the drill string.

In contrast, roller cone bits are drill bits having cones rotatably mounted onto journals. The roller cone bit typically includes a bit body having at least one journal, in which a cone is mounted thereupon and allowed to rotate. As the bit body is rotated by the drill string and/or downhole motor, the cones may rotatably contact the earth's formation. A plurality of cutting elements arranged on the roller cones crush and scrape the earth's formation as the bit is rotated. Although both types of drill bit may be applicable to embodiments disclosed herein, for purposes of brevity, only shear bits will be discussed from this point forward.

An example of a shear bit having a plurality of cutters with ultra hard working surfaces is shown in FIG. 2. A shear-type drill bit 10 includes a bit body 12 and a plurality of blades 14 formed on bit body 12. Blades 14 may be separated by channels or gaps 16 that enable drilling fluid to flow between and both clean and cool blades 14 and cutters 18. Cutters 18 may be held in blades 14 at predetermined angular orientations and radial locations to present working surfaces 20 at a desired back rake angle against a formation to be drilled. Typically, working surfaces 20 may be generally perpendicular to an axis 19 and side surface 21 of a cylindrical cutter 18. Thus, working surface 20 and a side surface 21 may meet or intersect to form a circumferential cutting edge 22.

Orifices are typically formed in the drill bit body 12 and positioned in the gaps 16. The orifices may be adapted to accept nozzles 23 and allow drilling fluid to be discharged through the bit in selected directions and at selected rates of flow between the cutting blades 14 for lubricating and cooling drill bit 10, blades 14 and cutters 18. The drilling fluid may also clean and remove the cuttings as the drill bit rotates and penetrates a geological formation. Gaps 16, which may be referred to as "fluid courses," may be positioned to provide additional flow channels for drilling fluid and to provide a passage for formation cuttings to travel past the drill bit 10 toward the surface of a wellbore (15 of FIG. 1).

Shear bits may be further grouped into several categories including steel body bits and matrix body bits. Steel body bits traditionally have bit heads machined from solid piece of metal, typically steel. Upon completion of the machining, the bit head may be mated and assembled to a bit shank. Typically, the bit heads include the cutting elements and the bit shank includes a connection (typically threaded) to the remainder of the drill string. Hydraulic chambers (nozzles, passages, plenums, etc.) may be located in both the head and shank portions so that once assembled, a hydraulic network exists in the assembled drill bit. Typically, shear bits use polycrystalline diamond compact ("PDC") cutters or some other type of ultra hard and wear resistant material to shear the earth formation.

In contrast, matrix body bit heads are typically constructed using a powder metallurgy manufacturing process. A cutter head mold of the desired bit head shape is constructed and filled with matrix powder a binder agent, and at least one rigid (e.g., steel) structural element. Next, the mold is placed in a furnace to allow the binder to melt and infiltrate the matrix powder (i.e., a sintering process). As the binder infiltrates the matrix powder, a solid metal casting is formed and fused to the rigid structural element. Thus, once the sintering process is completed, a powder metallurgy-created bit head remains that may be attached to a steel (or other material) bit shank in a manner similar to the steel body bits. Two types of matrix body bits include bits incorporating PDC cutters and bits incorporating natural diamonds impregnated in the matrix powder to scrape the formation. Bits may be manufactured with combinations of the two matrix bit body technologies.

Regardless of the type of shear bit created, the manufacturing process may include a step whereby the bit head crown (either machined or molded) is attached to the bit shank so that a completed bit is constructed. Formerly, the bit heads and the bit shanks may have been formed with corresponding service threads so that they could be threaded together at final assembly. Threaded bit shanks and bit heads had the additional advantage in that they allowed for the attachment of fixtures and tooling to the bit components at various stages of manufacture. For example, a lifting jig may have been threaded to the service threads of a bit shank to assist in lifting and carrying an unfinished bit shank through a process line. Similarly, service threads (e.g., formed upon the rigid structural element of a matrix head PDC bit) of a bit head could have been used to secure a bit head during sintering, transport, or assembly of cutters and/or nozzles.

SUMMARY OF THE CLAIMED SUBJECT MATTER

In one aspect, the present disclosure relates to a method to manufacture a drill bit including constructing a bit head portion of the drill bit, constructing a bit shank portion of the drill bit, aligning the bit head portion with the bit shank portion, and electron beam welding a butted joint between the bit head portion and the bit shank portion.

In another aspect, the present disclosure relates to a method to manufacture a drill bit including sintering a bit head portion from a matrix powder and a binder material, machining a bit shank portion, threading the bit shank portion to the sintered bit head portion, electron beam welding a butted joint between the threaded bit head portion and the bit shank portion, and securing a plurality of PDC cutter elements about the sintered bit head portion.

BRIEF DESCRIPTION OF DRAWINGS

Features of the present disclosure will become more apparent from the following description in conjunction with the accompanying drawings.

DETAILED DESCRIPTION

Figure 1:
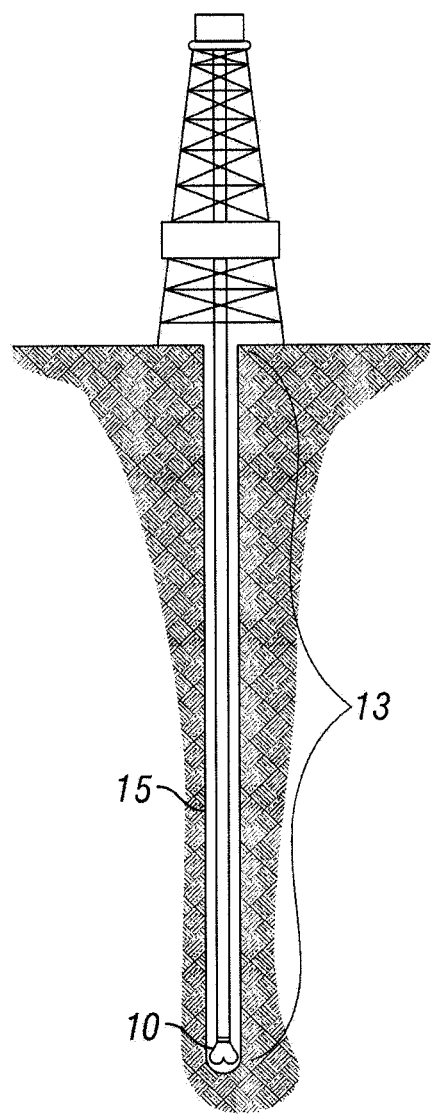
FIG. 1 is a schematic representation of a drilling operation incorporating drill bits manufacturable by embodiments of the present disclosure.
Figure 2:
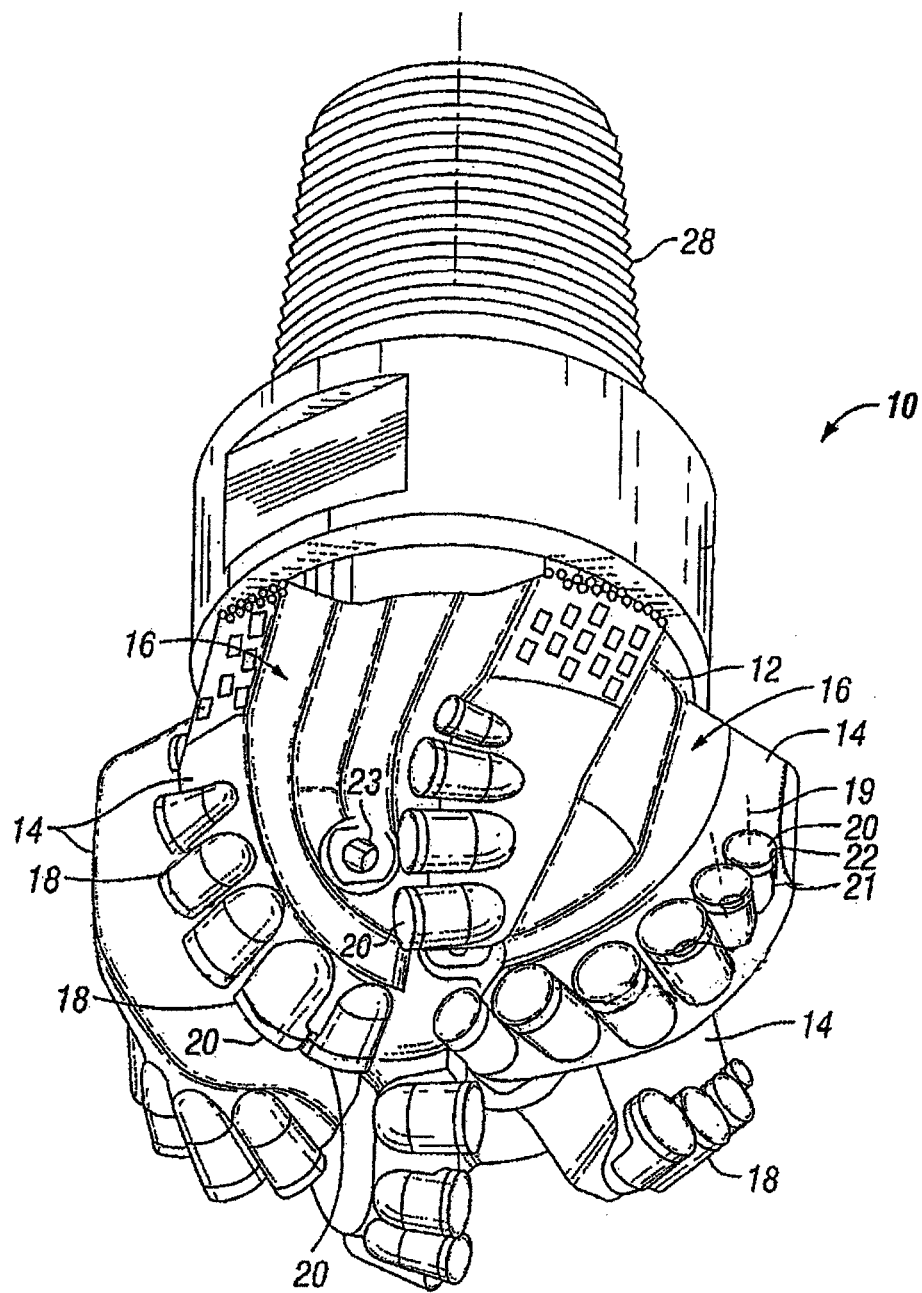
FIG. 2 depicts a drill bit in manufacturable by embodiments of the present disclosure.

As oilfield drill bits are designed to be used in environments characterized by extreme temperature, vibration, and pressure, a threaded connection is not considered sufficient to retain a bit head atop a bit shank. Thus, former designs often included a welding process whereby a joint between the bit head crown and shank was welded in place to prevent undesired decoupling in service.

To perform this welding operation, a bit shank having a female service thread would have been threaded onto a bit head having a corresponding male service thread and may have been further torqued to a desired make-up torque. Once threaded, the bit components were preheated and welded using a submerged arc welding ("SAW") process. However, the former SAW process had various disadvantages. In particular, as a traditional welding operation incorporating a flux material to facilitate the welding process, there was potential for slag inclusions and fill voids to be left in the finished product.

Additionally, as a traditional welding process, many welding passes (or a single, lengthy pass) were required to finish a single bit head/bit shank connection, often taking between about 1 to 4 hours time to complete. Further, as the bit/shank combination is subjected to a lengthy traditional weld process, the temperature of the workpiece would have had to be carefully monitored so that the interpass temperature did not exceed a value that would have detrimentally affected the strength of the shank/head components. In particular, in certain bit designs having components tempered at 1000° F., the interpass temperature was monitored so that it would remain below 900° F.

Further, in order to perform the welding operation, the connection between the bit head and shank had to be designed with a chamfered weld area extending circumferentially around the connection. Often, the chamfered weld area resembled a trapezoidal groove (e.g., profiles 112 and 114 of FIG. 3, discussed below), in which a weld bead (e.g., a submerged arc welding bead) could be applied to the connection.

As such, the welding operation would have been performed continuously until the chamfered groove was sufficiently filled with weld material, overlapping new weld bead over old weld bead helically as the workpiece was turned. As expected, overlapping weld beads over one another was cause for concern that voids may be left underneath, thereby weakening the welded connection.

In contrast, embodiments disclosed herein incorporate electron beam ("EB") welding methods that may be used in conjunction with a service-threaded drill bit shank and head to more effectively weld the two components together into a completed oilfield drill bit. EB welding is a process by which a workpiece is instantaneously melted through kinetic energy created by a beam of electrons (generated by an electron gun) aimed and impacted against the workpiece, typically in a vacuum. Because the beam of electrons is focused extremely narrowly, only a fine band of the workpiece is melted and, despite the temperature of the process exceeding 25,000° C., very little heat is deposited into the bulk workpiece.

As such, EB welding has the capability to weld workpieces together up to 6 inches (15 cm) thick rapidly and with minimal heat transfer to the workpiece. Because of the rapid pace and minimal amount of heat transferred to the workpiece, the heat affected zone ("HAZ") of EB welded workpieces is significantly reduced when compared to traditional welding processes (including submerged arc welding). Therefore, in selected embodiments of the present disclosure, bit head and bit shank components may be EB welded together using a rapid process to weld them together without need to monitor the interpass temperature. Furthermore, because EB welding is a flux-free process, the risk of slag inclusions is minimized. Further still, because a single pass with an EB welding beam is sufficient to weld the entire thickness of the bit head and shank together, the risk of voids resulting from overlapped weld beads is essentially eliminated.

Figure 3:
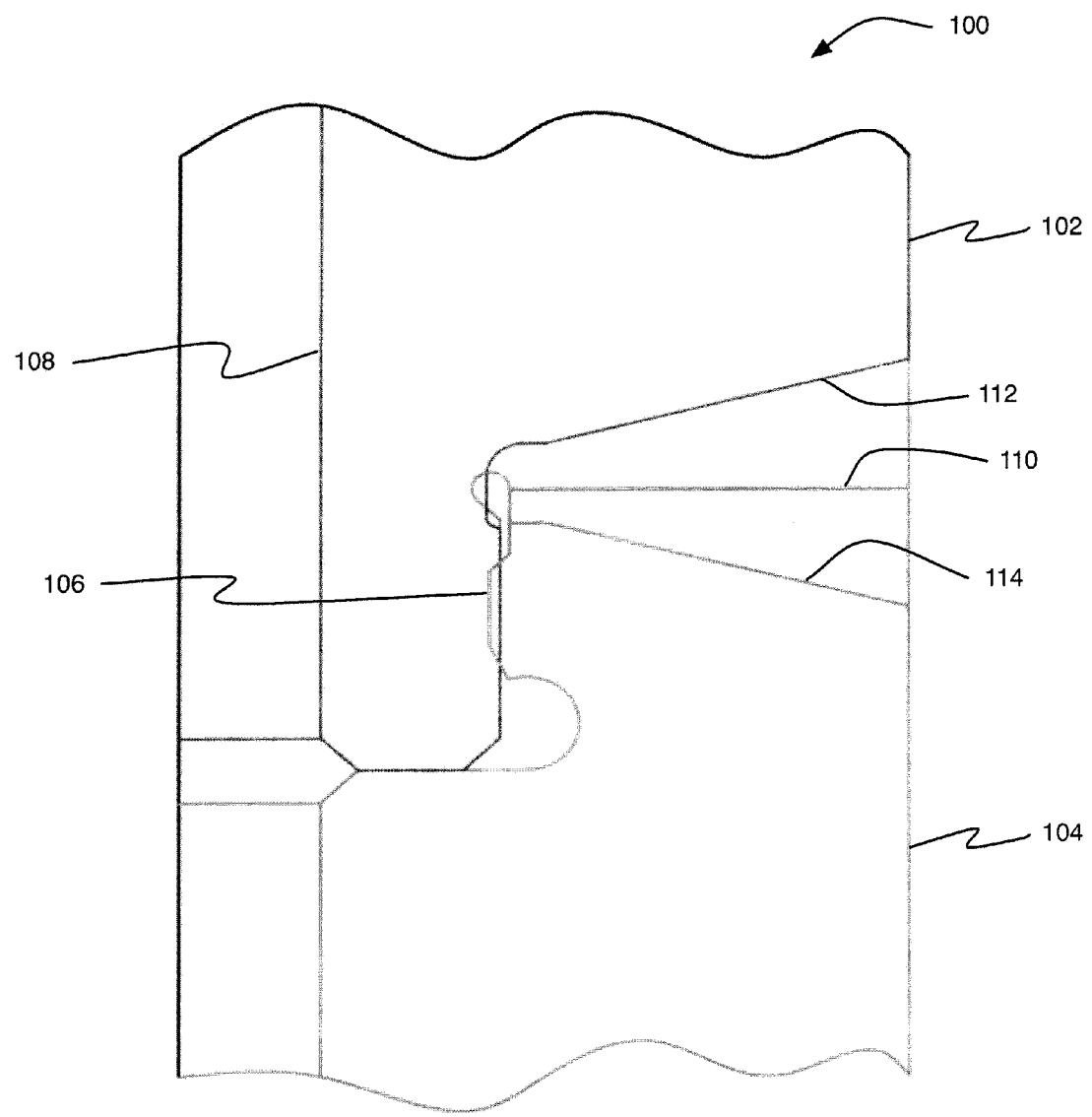
FIG. 3 is a schematic representation of a drill bit geometry manufacturable by embodiments of the present disclosure compared with a drill bit geometry manufactured using former processes.

Referring now to FIG. 3, an exemplary design for an oilfield drill bit in accordance with embodiments of the present disclosure is shown. Drill bit assembly 100 includes a bit head portion 102 and a bit shank portion 104 threadably coupled together by a threaded connection 106. As shown, threaded connection 106 includes a male threaded portion extending from bit head 102 and a female threaded portion extending from bit shank 104, but it should be understood that any threading configuration may be used for connection 106 without departing from the scope of present disclosure. Furthermore, threaded connection 106 is shown located inboard of a central bore 108 of drill bit assembly 100 and serves to connect and align (axially and cylindrically) bit head 102 with bit shank 104 prior to a welding operation. Alternatively, other mechanisms to mechanically connect and align bit head 102 with bit shank 104 for the purpose of welding them together (in addition to threading) would be within the scope of the present disclosure. For example, corresponding bit heads and bit shanks may be assembled together using slip fits, interference fits, or may be held in place with additional fixturing to maintain the mating surfaces together before and during the welding process.

As shown, bit head portion 102 and bit shank portion 104 are constructed such that they abut each other at a parting line 110. Because EB welding is capable of penetrating several inches of a metal-to-metal joint to be welded, a straight parting line 110 may be used with bit assembly 100 without the need to form a trapezoidal groove of former designs. For example, chamfered surfaces 112 and 114 of bit head 102 and bit shank 104 depict cuts that would be necessary using former bit head and bit shank designs in order to perform an SAW (or any other welding) process of former methods.

Once aligned, the workpiece may be placed within a vacuum chamber so that excess oxygen (and other airborne contaminants) may be evacuated from the chamber. Depending on the workpiece thickness and material composition, varying amounts of vacuum may be necessary to perform the EB welding operation. In selected embodiments, the time necessary to evacuate the welding chamber may exceed the total amount of time to perform the EB welding operation. Thus, for example, in a four-minute process, it may take three minutes to evacuate the welding chamber, and only one minute to perform the EB welding.

Advantageously, methods in accordance with embodiments disclosed herein allow for a more rapid final assembly of shear bits used in oilfield applications. In particular, electron beam welding may accomplish a welding operation in about 0.5 to 4 minutes that would have formerly taken 1 to 4 hours in a submerged arc welding process.

Further, as a result of the reduced welding time and the reduced amount of heat associated with EB welding, shear bits manufactured using methods disclosed herein may be manufactured without the need to monitor the interpass temperature during the weld process. Further still, shear bits manufactured in accordance with embodiments disclosed herein may be assembled without concern of imperfections caused by the use of welding flux as would be required in the former SAW process.

Additionally, EB welding is a stronger form of weld than that produced by the SAW process. In certain applications, the EB welds disclosed herein may result in welds in steel that are stronger than the base material in which they are welded. As such, shear bits manufactured using the methods disclosed herein may be stronger than prior manufactured bits.

While the disclosure has been presented with respect to a limited number of embodiments, those skilled in the art, having benefit of this disclosure, will appreciate that other embodiments may be devised which do not depart from the scope of the present disclosure. Accordingly, the scope of the invention should be limited only by the attached claims.

What is claimed is:

1. A method to manufacture a drill bit, the method comprising:
   constructing a bit head portion of the drill bit;
   constructing a bit shank portion of the drill bit;
   aligning the bit head portion with the bit shank portion;
   attaching the bit head portion and the bit shank portion at a threaded connection;
   abutting co-planar surfaces of the bit head portion and the bit shank portion, wherein the abutted co-planar surfaces extend radially outward in a single plane from the threaded connection to an outer circumference of the drill bit; and
   electron beam welding the abutted co-planar surfaces between the bit head portion and the bit shank portion.

2. The method of claim 1, further comprising evacuating air from a welding chamber surrounding the aligned bit head portion and the bit shank portion.

3. The method of claim 1, further comprising aligning the bit head portion axially with the bit shank portion.

4. The method of claim 1, further comprising aligning the bit head portion circumferentially with the bit shank portion.

5. The method of claim 1, further comprising:
   manufacturing complementary service threads on the bit head and bit shank portions of the drill bit; and
   threadably assembling the bit head portion of the drill bit to the bit shank portion of the drill bit.

6. A method to manufacture a drill bit, the method comprising:
   sintering a bit head portion from a matrix powder and a binder material;
   machining a bit shank portion;
   attaching the bit shank portion to the sintered bit head portion at a threaded connection;
   abutting co-planar surfaces of the bit head portion and the bit shank portion, wherein the abutted co-planar surfaces extend radially outward in a single plane from the threaded connection to an outer circumference of the drill bit;
   electron beam welding the abutted co-planar surfaces between the bit head portion and the bit shank portion; and
   securing a plurality of PDC cutter elements about the sintered bit head portion.

7. The method of claim 6, further comprising installing flow nozzles into the sintered bit head portion.

8. The method of claim 6, further comprising axially aligning the sintered bit head portion with the machined bit shank portion.

9. The method of claim 6, further comprising circumferentially aligning the sintered bit head portion with the machined bit shank portion.

10. The method of claim 6, further comprising evacuating air from a welding chamber surrounding the bit shank portion and the sintered bit head portion.

* * * * *